United States Patent
Kodama et al.

(10) Patent No.: US 7,873,733 B2
(45) Date of Patent: Jan. 18, 2011

(54) LOAD DISTRIBUTION METHOD, LOAD DISTRIBUTION DEVICE, AND SYSTEM INCLUDING LOAD DISTRIBUTION DEVICE

(75) Inventors: Akihiro Kodama, Fukuoka (JP); Tomoyuki Uekado, Fukuoka (JP); Masataka Mukaihara, Fukuoka (JP); Yuji Ito, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 126 days.

(21) Appl. No.: 12/412,474

(22) Filed: Mar. 27, 2009

(65) Prior Publication Data
US 2009/0248865 A1     Oct. 1, 2009

(30) Foreign Application Priority Data
Mar. 28, 2008  (JP) .............................. 2008-087561

(51) Int. Cl.
G06F 15/173  (2006.01)
(52) U.S. Cl. .................. 709/226; 709/223; 709/224
(58) Field of Classification Search ................ 709/223, 709/224, 226
See application file for complete search history.

(56) References Cited

U.S. PATENT DOCUMENTS

| | | | |
|---|---|---|---|
| 5,983,281 A * | 11/1999 | Ogle et al. .................. 709/249 |
| 6,259,705 B1 * | 7/2001 | Takahashi et al. ........... 370/465 |
| 6,425,007 B1 * | 7/2002 | Messinger ................... 709/224 |
| 6,438,595 B1 * | 8/2002 | Blumenau et al. ........... 709/226 |
| 6,745,241 B1 * | 6/2004 | French et al. ............... 709/221 |
| 6,880,156 B1 * | 4/2005 | Landherr et al. ............ 718/105 |
| 7,080,378 B1 * | 7/2006 | Noland et al. ............... 718/104 |
| 7,664,859 B2 * | 2/2010 | Kudo et al. .................. 709/226 |
| 2005/0021530 A1 * | 1/2005 | Garg et al. ................... 707/100 |
| 2005/0102398 A1 * | 5/2005 | Zhang et al. ................. 709/225 |
| 2005/0193113 A1 * | 9/2005 | Kokusho et al. ............. 709/225 |

FOREIGN PATENT DOCUMENTS

| | | |
|---|---|---|
| JP | 2005-196333 | 7/2005 |
| JP | 2006-285315 | 10/2006 |
| JP | 2006-309345 | 11/2006 |

* cited by examiner

*Primary Examiner*—Hussein A Elchanti
(74) *Attorney, Agent, or Firm*—Staas & Halsey LLP

(57) ABSTRACT

A load distribution device that receives processing requests from terminals and that allocates and transfers the processing requests to at least one of a plurality of servers. The load distribution device includes a monitoring unit, a request receiving unit, an update server determining unit, a distribution ratio setting unit, a load distribution unit, a notification unit and an update completion detecting unit, whereupon receipt of a notification that the update of the server to be updated is completed, the update server determining unit determines that the update to the server to be updated is completed, determines a new server to be updated and a new server to be updated next, and instructs the distribution ratio setting unit to set the distribution ratios.

8 Claims, 12 Drawing Sheets

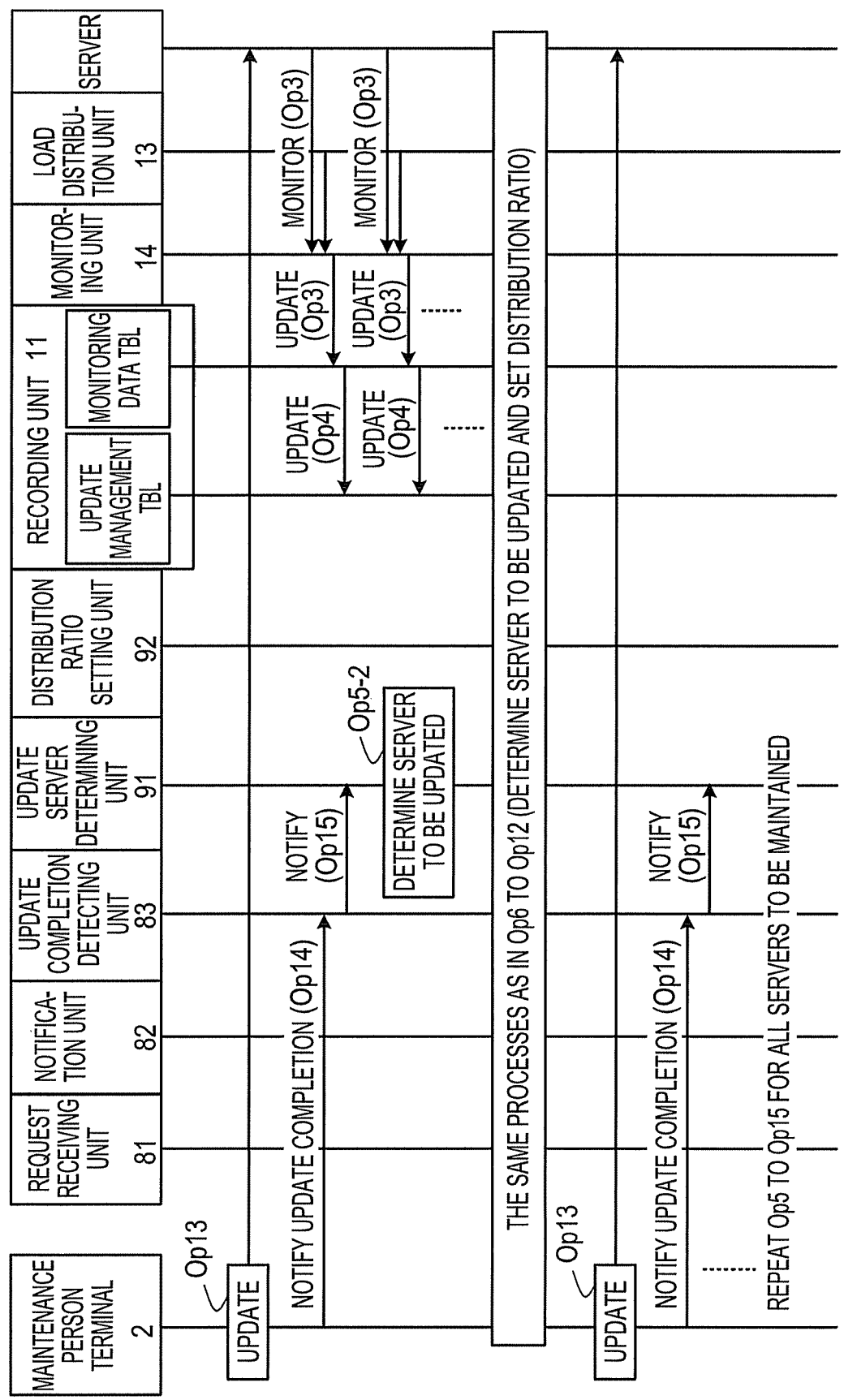

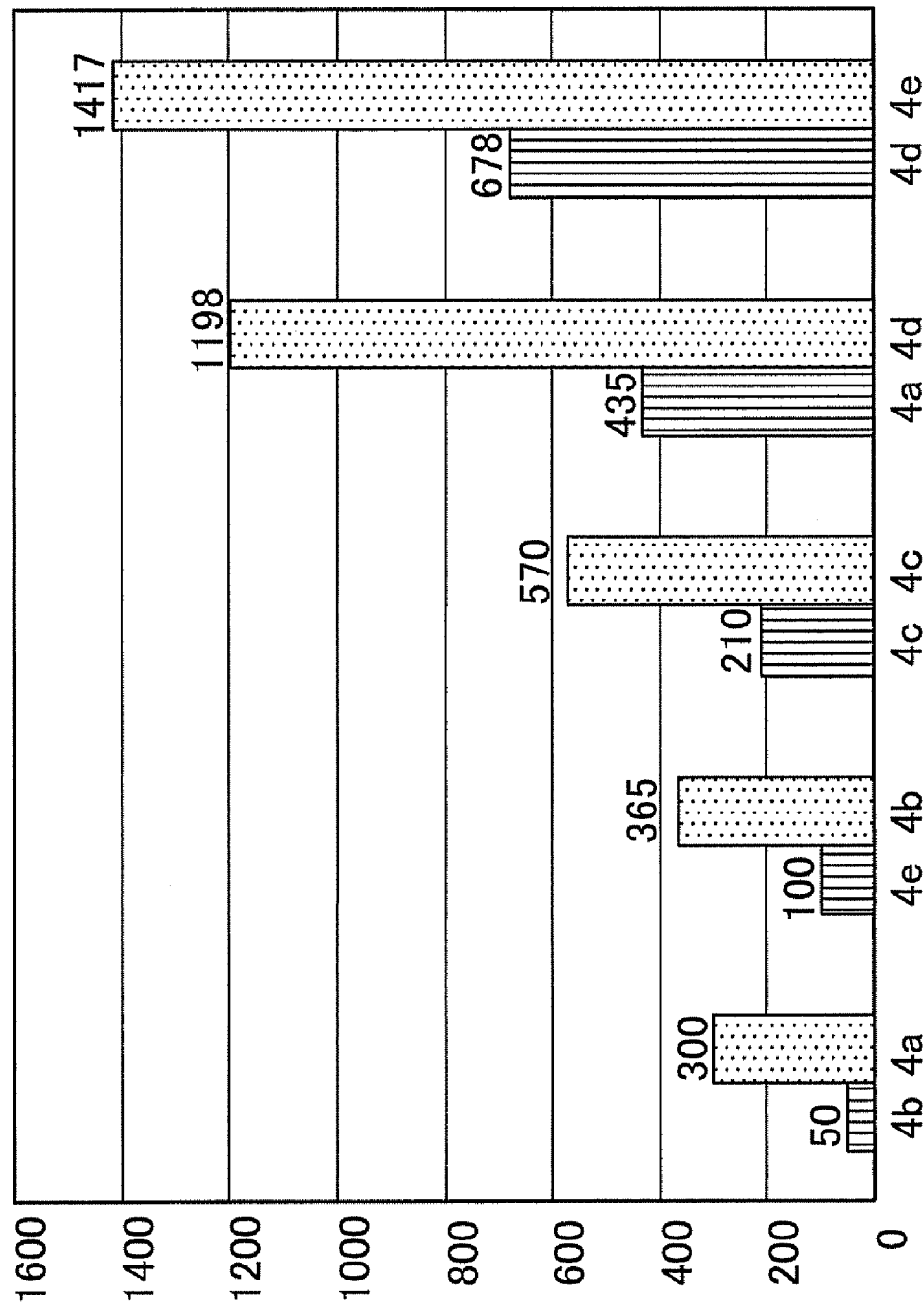

LOAD DISTRIBUTION METHOD, LOAD DISTRIBUTION DEVICE, AND SYSTEM INCLUDING LOAD DISTRIBUTION DEVICE

CROSS-REFERENCE TO RELATED APPLICATIONS

This application is based upon and claims the benefit of priority of the prior Japanese Patent Application No. 2008-087561, filed on Mar. 28, 2008, the entire contents of which are incorporated herein by reference.

BACKGROUND

1. Field

The present invention relates to a load distribution device, a load distribution program, and a load distribution method for receiving processing request(s) from terminal(s) and allocating and transferring the processing request(s) to at least one of a plurality of servers.

2. Description of the Related Art

In recent years, there is a service provider server that provides various services such as Web sites, e-mail, IP (Internet Protocol) phones, and file servers on an IP network. The service provider server provides services using, for example, the Web, FTP (File Transfer Protocol), and Telnet to the clients. As the users increase and the dimensions of the services become large, certain measures need to be taken in the service provider servers to provide stable services. An example of the measures includes increasing the number of service provider servers with performance remaining about the same as the existing service provider servers. In that case, a load distribution system is built up in which a load distribution device is used to distribute the load to a plurality of service provider servers.

The load distribution device is a device that receives requests of processing from terminals of service users (clients) and that allocates the requests to a plurality of service provider servers providing the same services, thereby reducing the load to specific service provider servers. The load distribution device is installed, for example, between the terminals of the clients and a service provider server group. The installation of the load distribution device can prevent degradation of the service quality due to a concentrated load on specific service provider servers and can pursue providing comfortable services to the clients.

Even after the operation of the service provider server is started, updates of software or hardware constituting the service provider servers are needed for various factors such as for correcting bugs, improving functions, and improving the security. Examples of the updates of software of the service provider servers include upgrading applications, applying security patches, and updating kernels and firmware. The maintenance person uses a portable storage medium such as a CD (Compact Disk) and a flash memory to update the software in some cases. An appliance server including an automatic update function updates the software of the service provider server in other cases.

The appliance server is a server designed and developed for specific applications. The appliance server including the automatic update function automatically detects software update information (patches) through a network in collaboration with a provider vendor to deal with the detection of security holes or failures. The appliance server then automatically executes an updating operation of a server to be maintained based on the detected update information.

The operation of the service provider server is unstable during the update of software of the service provider server. Therefore, the service providing function needs to be stopped. For example, a method for changing the software configuration of server is proposed, in which calculation process requests from the clients are not distributed to a server whose software configuration will be changed, and the software configuration is changed after a certain period of time or after the number of calculation process requests remaining in the server is checked (see, for example, Japanese Patent Laid-Open No. 2006-285315).

SUMMARY

A load distribution device disclosed in the present description receives processing requests from terminals and allocates and transfers the processing requests to at least one of a plurality of servers. A load distribution device and method include monitoring communication data between each of the plurality of servers and the terminals or an operation state of each of the plurality of servers to store data indicating an amount of processing executed by each server receiving the processing requests from the terminals, receiving a request of an update preparation of the plurality of servers from a maintenance person terminal or an automatic update server, determining a first non-updated server that includes a least amount of processing as a server to be updated and determining a second non-updated server other than the first non-updated server that includes a least amount of processing of server as a server to be updated next.

According to an embodiment a load distribution device includes a distribution ratio setting unit setting distribution ratios of new processing requests to other servers and recording distribution ratios to the recording unit, a load distribution unit allocating and transferring the new processing requests from the terminals to at least one of the plurality of servers based on the distribution ratios, a notification unit notifying the maintenance person terminal or the automatic update server that the server to be updated can be updated, and an update completion detecting unit receiving the notification, where when the notification is received, the update server determining unit determines that the server to be updated completed with the update is updated, determines a new server to be updated and a new server to be updated next, and instructs the distribution ratio setting unit to set the distribution ratios.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 illustrates a sequence diagram of an operation example of a load distribution device in an embodiment;

FIG. 6 illustrates a graph of a number of connections at stages before blocking of servers illustrated in FIG. 5A, and a bar graph of a number of connections at stages before blocking of the servers illustrated in FIG. 5B, side by side for each blocking stage of server;

DETAILED DESCRIPTION OF EMBODIMENTS

Figure 1:
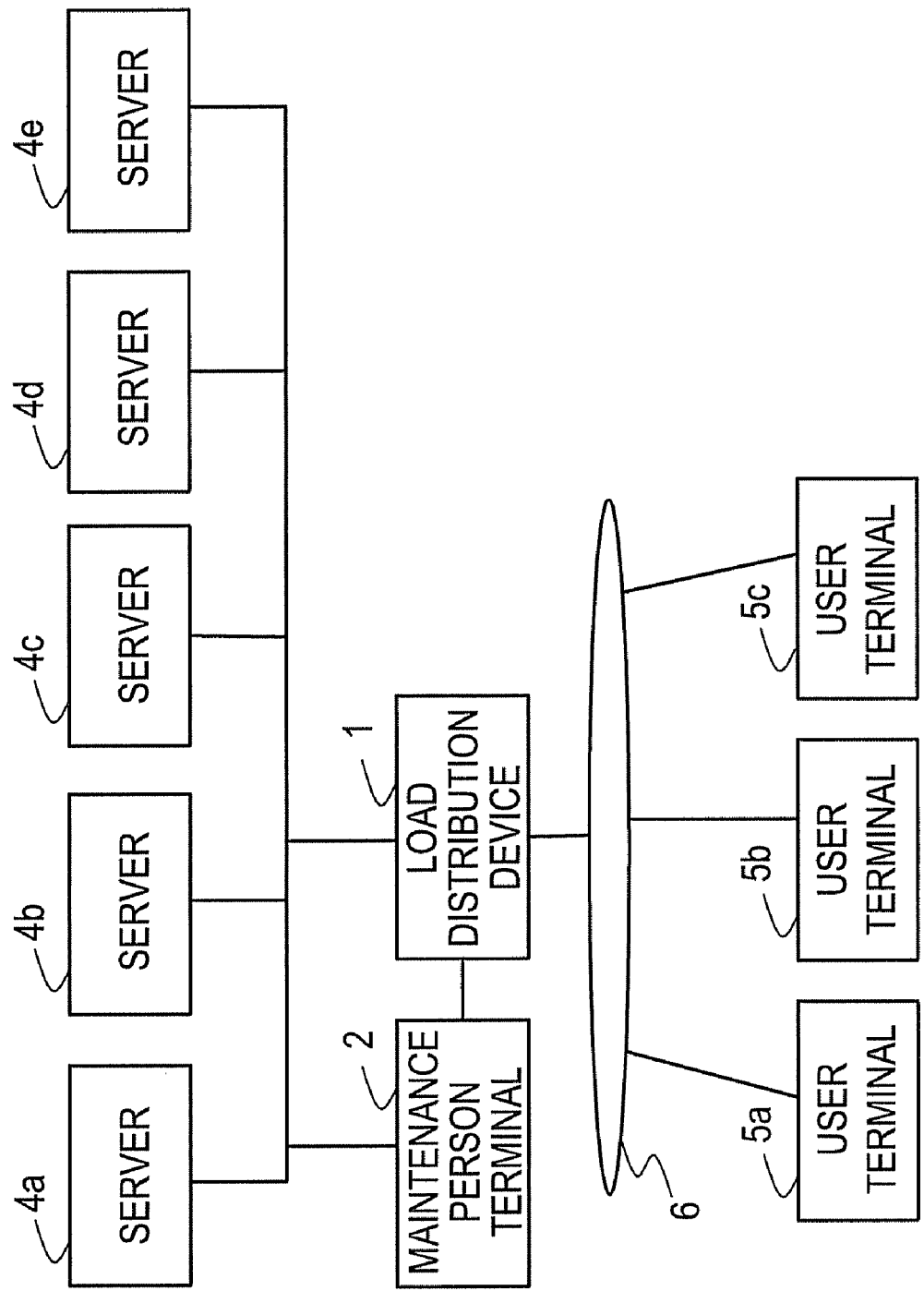
FIG. 1 depicts a configuration of an entire network including a load distribution device of an embodiment.

Reference will now be made in detail to the embodiments, examples of which are illustrated in the accompanying drawings, wherein like reference numerals refer to the like elements throughout. The embodiments are described below to explain the present invention by referring to the figures.

There should be no access from client(s) to a service provider server to be updated to prevent an error from occurring in the middle of the processing of the requests from the client(s) during the update of the service provider server. For this purpose, the load distribution device can follow a procedure of not allocating accesses (processes) to the service provider server to be updated other than already existing accesses (hereinafter, this is referred to as "pre-block") and completely terminating the accesses to the service provider server after the completion of the already existing accesses (processes) (hereinafter, this is referred to as "block").

The time required to update the service provider server is significantly affected by the time from pre-blocking to blocking, and it is desired to shorten the time. For example, the order of updates and the allocation conditions of a plurality of service provider servers can be appropriately determined to shorten the time from pre-blocking to blocking. However, many conditions, such as load status and server performance, need to be taken into consideration to determine an appropriate order of updates and allocation conditions. Therefore, a great effort is required for the maintenance person (administrator or user with particular privileges) to examine the conditions and specify settings to shorten the time of interruption of service or transmission of data. Furthermore, as the updating process of a plurality of service provider servers progresses, the maintenance person must change the setting of the allocation conditions every time the updating process of one service provider server is finished. Therefore, a large operational burden is imposed on the maintenance person.

Thus, an object of the present invention is to provide a load distribution device, a load distribution program, and a load distribution method capable of reducing the time to update servers without imposing a burden on the maintenance person.

According to an embodiment, when a request receiving unit receives an update request, an update server determining unit determines a server with the least amount of processing requested from terminal(s) as a server to be updated and determines a server with the next least amount of processing or with the same amount of processing as a server to be updated next. A distribution ratio setting unit sets allocation ratios of the new processing requests to the server to be updated and the server to be updated next to 0. As a result, the load distribution unit transfers the new processing requests from the terminals to other servers instead of transferring to the server to be updated and the server to be updated next. Therefore, an amount of processing of the server to be updated and the server to be updated next continue to decrease and eventually become 0. In this case, as the update server determining unit determines the server with the least amount of processing as the server to be updated, the server with the amount of processing that is predicted to become 0 in the shortest time is set as the server to be updated.

While a notification unit provides a notification of the server to be updated to the maintenance person or an automatic update server, and the maintenance person or the automatic update server updates the server, the amount of processing of the server to be updated next continues to decrease. When an update completion receiving unit receives an update completion notification of the server to be updated, and the update server determining unit determines a new server to be updated and a server to be updated next, the amount of processing of the server to be updated next is decreased. Therefore, the server to be updated next with the decreased amount of processing or a server with less amount of processing is set as the new server to be updated. Therefore, the time required for the amount of processing of the new server to be updated to become 0 is short. As a result, the time to update the server is reduced without imposing a burden on the maintenance person. Furthermore, the effect on the throughput of the servers due to server updates can be limited.

In an embodiment of the present invention, the monitoring unit may also record data indicating a load of each of the plurality of servers in the recording unit, and the distribution ratio setting unit may calculate the distribution ratios of the servers other than the server to be updated and the server to be updated next based on the load of each of the plurality of servers recorded in the recording unit.

As a result, the distribution ratio setting unit can determine the distribution ratios according to the load conditions of the servers. The distribution ratios can be adjusted according to the load of the servers, such as by lowering the ratio allocated to a server with high load.

In an embodiment of the present invention, the request receiving unit may receive an update request of update information from the automatic update server that has detected the update information of the plurality of servers through the network.

As a result, the plurality of servers are automatically updated based on the update information detected by the automatic update server, and the time to update the servers is reduced. The effects by the degraded functions of the servers associated with the updates can be limited.

A load distribution system of the present invention includes a load distribution device receiving processing requests from terminals and allocating and transferring the processing requests to at least one of a plurality of servers and an automatic update server automatically updating the plurality of servers. The automatic update server may comprise an update information monitoring unit detecting update information of the plurality of servers through a network; a communication unit transmitting the update request of the plurality of servers to the load distribution device when the update information is detected; and an automatic updating unit automatically updating the plurality of servers based on the update information. The load distribution device may comprise a monitoring unit monitoring communication data between each of the plurality of servers and the terminals or an operation state of each of the plurality of servers to store data indicating an amount of processing, which processing is executed by each server receiving the processing requests from the terminals, in a recording unit; a request receiving unit receiving a request of update preparation of the plurality of servers from the automatic update server.

An update server determining unit determining a server among the plurality of servers that is a non-updated server and that includes the least amount of processing of server indicated by the data of the recording unit as a server to be updated and determining a server that is a non-updated server other than the server to be updated and that includes the least amount of processing of server as a server to be updated next; a distribution ratio setting unit setting a distribution ratio of new processing requests for each of the plurality of servers so that the new processing requests from the terminals are not allocated to the servers determined as the server to be updated and the server to be updated next but are allocated to other servers and recording the distribution ratios to the recording unit.

A load distribution unit allocating and transferring the new processing requests from the terminals to at least one of the plurality of servers based on the distribution ratios; a notification unit monitoring an amount of processing of the server to be updated indicated by data in the recording unit, and when the server to be updated is determined to have become updatable, notifying the automatic update server of the fact that the server to be updated can be updated; and an update completion detecting unit receiving the notification from the automatic update server of the fact that the update of the server to be updated is completed, where if the update completion detecting unit receives the notification of the fact that the update of the server to be updated is completed, the update server determining unit determines that the update to the server is completed, determines a new server to be updated and a new server to be updated next, and instructs the distribution ratio setting unit to set the distribution ratios.

A computer-readable storage medium stores a load distribution program for causing a computer to execute operation(s). The operations include receiving processing requests from terminals, allocating and transferring the processing requests to at least one of a plurality of servers. A monitoring process monitoring communication data between each of the plurality of servers and the terminals or an operation state of each of the plurality of servers to store data indicating an amount of processing, which processing executed by each server receiving the processing requests from the terminals, in a recording unit accessible by the computer; a request receiving process for receiving a request of update preparation of the plurality of servers from a maintenance person terminal or an automatic update server; an update server determining process for determining a server among the plurality of servers that is a non-updated server and that includes the least amount of processing of server indicated by the, data of the recording unit as a server to be updated and for determining a server that is a non-updated server other than the server to be updated and that includes the least amount of processing of server as a server to be updated next; a distribution ratio setting process setting a distribution ratio of new processing requests for each of the plurality of servers so that the new processing requests from the terminals are not allocated to the servers determined as the server to be updated and the server to be updated next but are allocated to other servers and for recording the distribution ratios to the recording unit; a load distribution process for allocating and transferring the new processing requests from the terminals to at least one of the plurality of servers based on the distribution ratios; a notification process for monitoring the amount of processing of the server to be updated indicated by the data in the recording unit, and when the server to be updated is determined to have become updatable, notifying the maintenance person terminal or the automatic update server of the fact that the server to be updated can be updated; and an update completion detecting process receiving the notification from the maintenance person terminal or the automatic update server of the fact that the update of the server to be updated is completed, where if the notification of the fact that the update of the server to be updated is completed is received in the update completion detecting process and if a non-updated server exists, the server to be updated completed with the update is determined to be updated, and the computer is caused to repeatedly execute the update server determining process, the distribution ratio setting process, the load distribution process, the notification process, and the update completion detecting process.

FIG. 1 depicts a configuration of an entire network including a load distribution device of an embodiment. A load distribution device 1 of an embodiment receives processing requests from user terminals 5a to 5c to servers 4a to 4e through a network 6 and allocates the processing requests to any of the servers 4a to 4e. The load distribution device 1 further includes a function of efficiently distributing the load to the plurality of servers 4a to 4e when updating the functions of the servers 4a to 4e, the function requiring short time to update without imposing a burden on the maintenance person.

As illustrated in FIG. 1, the load distribution device 1 is arranged at a location accessible by the user terminals 5a to 5c through the network 6 and is connected to the servers 4a to 4e. The servers 4a to 4e and the load distribution device 1 can also be accessed from a maintenance person terminal 2. The maintenance person of the servers 4a to 4e can perform operations, such as setting various data and updating hardware or software, to the servers 4a to 4e through the maintenance person terminal 2, the operations necessary to maintain the servers 4a to 4e. The maintenance person can also instruct an operation to the load distribution device 1 through the maintenance person terminal 2.

The servers 4a to 4e receive processing requests from the user terminals 5a to 5c, execute desired processes, and return the process results. In this way, the servers 4a to 4e provide services to the users of the user terminals 5a to 5c. In an embodiment, servers 4a to 4e include the same functions and provide the same services. The load distribution device 1 transfers the processing requests from the user terminals 5a to 5c to any of the servers 4a to 4e, and the servers 4a to 4e process the processing requests.

The types and contents of the services provided by the servers 4a to 4e are not particularly limited. The servers 4a to 4e can provide services, such as providing information using the Web, FTP, or Telnet, as well as information services such as electronic commerce and ASP (Application Service Provider). Examples of the processing requests from the user terminals 5a to 5c to the 4a to 4e include HTTP (HyperText Transfer Protocol) requests, FTP requests, and commands of telnet communications.

In an embodiment, an example is described in which the servers 4a to 4e disclose and provide files to the users, the user terminals 5a to 5c establish an HTTP connection with one of the servers 4a to 4e through the load distribution device 1, and the HTTP connection is terminated when the download of the disclosed files is completed.

The load distribution device 1 may not be only configured to distribute processes to a plurality of servers providing the same services, but may also be configured to distribute processes to a plurality of servers with different service types.

Examples of the network 6 include the Internet and an intranet. The network 6 may also be connected to other networks such as a line switching network and a mobile communication network. The user terminals of other networks connected this way can also transmit processing requests to the servers 4a to 4e. The numbers of the user terminals and servers connected to the network 6 are not limited to the example illustrated in FIG. 1. Although only three user terminals are depicted in FIG. 1 due to space limitations, more than 1000 user terminals are connected in the description below.

Figure 2:
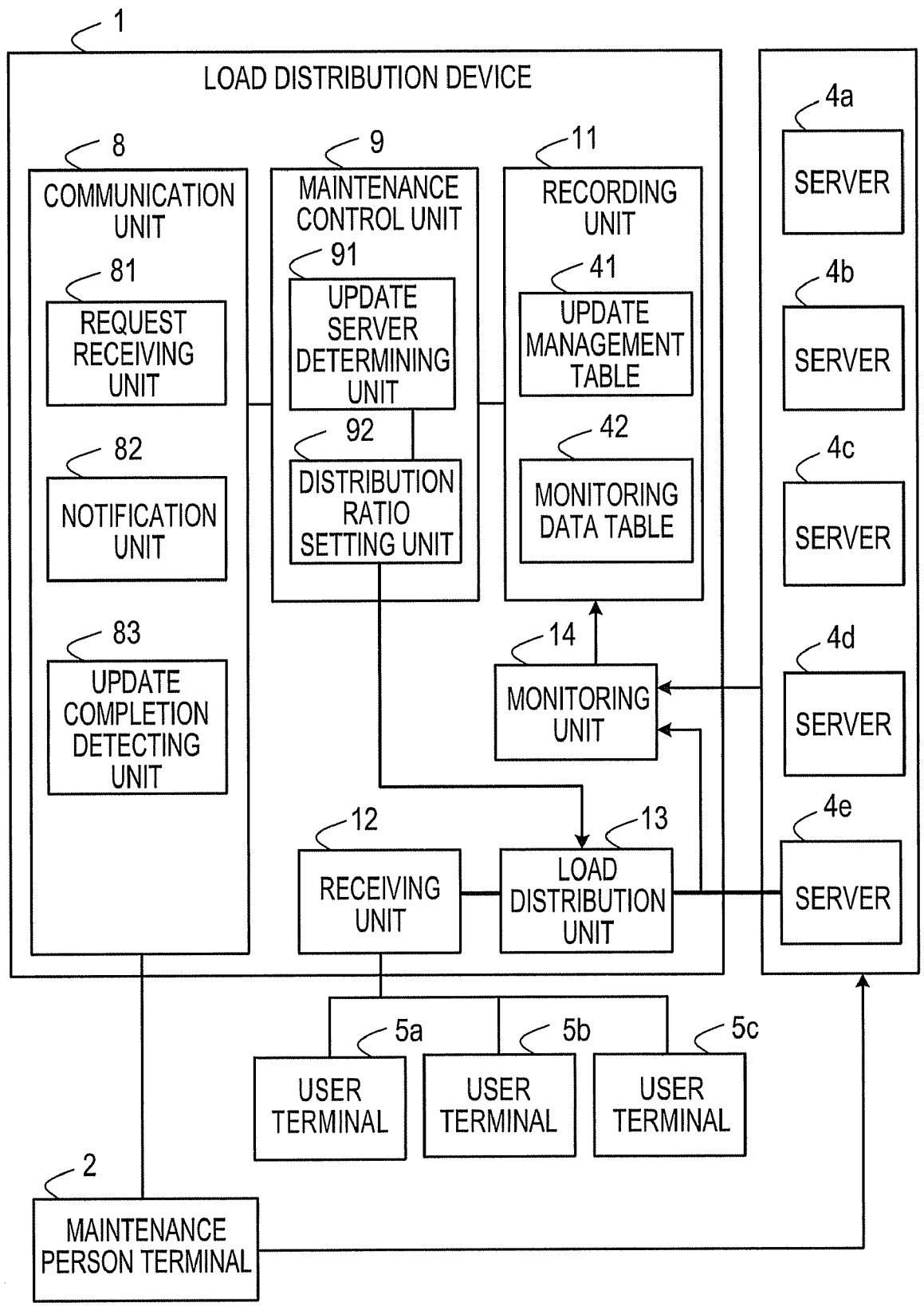
FIG. 2 illustrates a functional block diagram of a configuration of a load distribution device.

FIG. 2 is a functional block diagram of a configuration of the load distribution device 1. The load distribution device 1 comprises a communication unit 8, a maintenance control unit 9, a recording unit 11, a receiving unit 12, a load distribution unit 13, and a monitoring unit 14. The communication unit 8 includes a request receiving unit 81, a notification unit 82, and an update completion detecting unit 83. The recording unit 11 records information to an update management table 41 and a monitoring data table 42.

The load distribution device 1 can be constituted by, for example, a dedicated device equipped with a computer or by a general-purpose computer such as a personal computer and a server machine. A processor mounted on a computer executes a predetermined program to realize operations of the function units including the communication unit 8, maintenance control unit 9, the receiving unit 12, the load distribution unit 13, and the monitoring unit 14. Therefore, the program for functioning the computer as the function units and a recording medium recording the program are also included in the embodiments of the present invention. The same applies to the function units in FIG. 10 described below. The recording unit 11 is realized by a recording storage medium embodied in the computer or an external recording device accessible from the computer.

The configuration of the load distribution device 1 is not limited to the examples illustrated in FIGS. 1 and 2. For example, the functional blocks of the load distribution device 1 may be distributed and arranged in a plurality of computers connected with each other. The function units of the load distribution device 1 will now be described.

The receiving unit 12 analyzes frames received, for example, from the user terminals 5a to 5c to identify senders of the frames and transfer the frames to the load distribution unit 13. The load distribution unit 13 allocates and transfers the received frames to any of the servers 4a to 4e according to an allocation ratio (distribution ratio) set by a distribution ratio setting unit. An example of the allocation method includes a static weighted round robin.

The load distribution unit 13 may also allocate the frames in consideration of the senders of the frames. For example, the load distribution unit 13 can transfer frames in a series of communications from the same terminal to the same terminal.

In this way, if a connection is established between, for example, the server 4a and the user terminal 5a, the frames transmitted from the user terminal 5a are all transferred to the server 4a from the establishment of the connection till the termination of the connection.

The load distribution process by the receiving unit 12 and the load distribution unit 13 is not limited to the allocation in frames as in the example above. For example, allocation in packets in a higher layer is possible, and allocation in data in another layer is also possible.

The monitoring unit 14 monitors and analyzes traffic (received frames in this case) from the clients and registers traffic information (such as the number of sessions and the number of connections) of each of the allocation target servers 4a to 4e to the monitoring data table 42 of the recording unit 11. The monitoring unit 14 also communicates with the servers 4a to 4e to collect load information, such as CPU load and memory usage ratio, of each of the servers 4a to 4e and registers the load information in the monitoring data table 42. Therefore, the monitoring unit 14 includes a traffic monitoring function and a server monitoring function. The traffic information obtained from information transmitted and received by the servers and the load information indicating the load of servers are examples of data indicating amounts of processing that the servers are requested from the terminals.

Table 1 below is a table of an example of part of data contents recorded in the monitoring data table 42. In Table 1, a number of sessions, a number of connections, a CPU load, a memory usage ratio, and a bandwidth share ratio are recorded for each server. The contents of the monitoring data table 42 are not limited to the ones shown in Table 1, and other data obtained by monitoring may also be recorded.

TABLE 1

| Server | The Number of Sessions | The Number of Connections | CPU Load | Memory Usage Ratio | Bandwidth Share Ratio |
|---|---|---|---|---|---|
| Server 4a | 300 | 200 | 50% | 10% | 40% |
| Server 4b | 60 | 50 | 20% | 20% | 30% |
| Server 4c | 120 | 100 | 30% | 30% | 20% |
| Server 4d | 200 | 150 | 30% | 20% | 20% |
| Server 4e | 130 | 100 | 30% | 20% | 20% |

The data of the monitoring data table 42 is used by the maintenance control unit 9 in a process of updating the servers 4a to 4e in an embodiment. Thus, as described below, the maintenance control unit 9 extracts data necessary to allow efficient updates of the servers 4a to 4e in a short time from the monitoring data table 42 and records the data in the update management table 41.

The communication unit 8 includes an interface function for the load distribution device 1 to transmit and receive data to and from the maintenance person terminal 2. The request receiving unit 81 receives an update request from the maintenance person terminal 2 to the servers 4a to 4e. The update request includes, for example, information for specifying a server that the maintenance person wants to update (hereinafter referred to as "server to be maintained"). The request receiving unit 81 transfers the update request to the maintenance control unit 9.

After receiving the update request, the maintenance control unit 9 creates the update management table 41 that records data necessary to update the server to be maintained in the recording unit 11. The update server determining unit 91 and the distribution ratio setting unit 92 use the data of the update management table 41 to execute a determination process of the server to be updated and a setting process of the distribution ratio as described below.

The notification unit 82 notifies the maintenance person terminal 2 of the fact that the updating operation of the server to be updated can be started based on a notification from the maintenance control unit 9. The notification includes information for specifying the server to be updated that has become updatable. After receiving the notification, the maintenance person can start the updating operation of the server to be updated. When the updating operation is completed, the maintenance person uses the maintenance person terminal 2 to notify the load distribution device 1 of the fact that the updating operation is completed.

The update completion detecting unit 83 receives the notification from the maintenance person terminal 2 of the fact that the update of the server to be updated is completed. After receiving the notification, the update completion detecting unit 83 notifies the server completed with the update to the maintenance control unit 9. When the maintenance control unit 9 receives the notification, the update server determining unit 91 and the distribution ratio setting unit 92 are activated based on the notification.

The communication method between the communication unit 8 and the maintenance person terminal 2 is not particularly limited to the above-described operation(s). Examples of the communication between the communication unit 8 and the maintenance person terminal 2 include communication using a program such as Telnet and SSH (Secure Shell), communication using e-mail, and communication with combination of a program and e-mail. For example, the request receiving unit 81 may be configured to communicate with the maintenance person terminal 2 through Telnet, and the notification unit 82 and the update completion detecting unit 83 may be configured to communicate with the maintenance person terminal 2 by e-mail.

As described, after receiving the update request from the request receiving unit 81, the maintenance control unit 9 generates the update management table 41 and records the management table in the recording unit 11. The update management table 41 includes, for example, data indicating an amount of processing of the request(s) from the user terminal(s) of the servers to be maintained, data indicating whether updates are completed, and data for specifying a server to be updated and a server to be updated next.

The maintenance control unit 9 extracts necessary data from the monitoring data table 42 and records the data in the update management table 41 as data indicating the amount of processing. For example, the data indicating the amount of processing and data indicating whether the update is completed are recorded when the update management table 41 is generated.

Table 2 below depicts an example of data contents recorded in the update management table 41. The example shown in Table 2 illustrates data generated when the maintenance control unit 9 has received the update request (when the maintenance is started).

TABLE 2

| Server | The Number of Connections | CPU Load | Allocation Ratio | Update State |
|---|---|---|---|---|
| Server 4a | 300 | 50% | 30% | Not Updated |
| Server 4b | 50 | 20% | 5% | Not Updated |
| Server 4c | 150 | 30% | 15% | Not Updated |
| Server 4d | 400 | 30% | 40% | Not Updated |
| Server 4e | 100 | 20% | 10% | Not Updated |

In the example shown in Table 2, a number of connections, a CPU load, an allocation ratio (distribution ratio), and update state are recorded for each of the servers 4a to 4e. For example, one of four states "Not Updated", "Updated", "To Be Updated", and "To Be Updated Next" is recorded as the update state. As shown in Table 2, "Not Updated" is recorded as the update states of all servers when the maintenance control unit 9 generates the update management table 41.

The "Server To Be Updated" is a server that will be updated at this point. Specifically, it is a server to which the load distribution device 1 blocks access first at this point to perform the updating operation at this point. The state in the server in which the amount of processing of the processing requests from the user terminals is 0 will be called "blocked". The amount of processing is digitalized in the example described in an embodiment. Alternatively, the amount of processing relative to the possible amount of processing of the servers can be converted to stepwise values such as "High", "Medium", "Low", and "None", and the servers can be blocked when the state becomes "None". The act of the load distribution device 1 not allocating new processing requests from the user terminals to block the servers will be called "pre-blocking". Specifically, the "pre-blocking" is executed by the load distribution device 1 setting the allocation ratio so that new processing requests from the user terminals are not allocated to the servers. The "Server To Be Updated Next" is a server designed to be updated next after the server to be updated. Therefore, it is a server that will be blocked after the update of the server to be updated.

The update server determining unit 91 determines the server to be updated and the server to be updated next based on the data indicating the amount of processing in the update management table 41 and records data thereof in the update management table 41. For example, the update server determining unit 91 can determine a server that is "Not Updated" and that includes the least number of connections as the server to be updated. The update server determining unit 91 can determine a server among the "Not Updated" servers other than the server to be updated that includes the least number of connections as the server to be updated next. Therefore, the update server determining unit 91 can determine a server, which is expected to be blocked earliest unless a new processing request is received because the current amount of processing is the smallest, as the server to be updated.

After receiving a notification of the fact that the update of the server to be updated is completed from the update completion detecting unit 83, the update server determining unit 91 updates the update management table 41 based on the notification. In this case, the update state of the server to be updated that is completed with the update is switched to "Updated", and the update state of the server to be updated next is switched to "Server To Be Updated".

The distribution ratio setting unit 92 refers to the update management table 41 to calculate the allocation ratio of each server and issues an instruction to the load distribution unit 13. The distribution ratio setting unit 92 sets the allocation ratios of the server to be updated and the server to be updated next to 0, and the subtracted ratios are added to allocation ratios of other servers. Specifically, the distribution ratio setting unit 92 may equally divide and allocate the allocation ratios of the server to be updated and the server to be updated next to other servers. Thus, the allocation ratios of the two servers divided by the number of other servers are added to the original allocation ratios of the other servers. However, if all servers other than the server to be updated are updated, the allocation ratio of only the server to be updated is equally allocated to the other servers.

The distribution ratio setting unit 92 can also refer to information of the CPU load of each server recorded in the update management table 41 and remove the server(s) of which the CPU load has reached a threshold, from the allocation target. In this case, if the CPU load of a server removed from the allocation target falls below the threshold, the server becomes the allocation target again. A value recorded in advance by the maintenance person in the recording unit 11 is used as the threshold, for example. The distribution ratio setting unit 92 may also use values of the CPU load indicating the load or performance of other servers to determine whether to remove the servers from the allocation target.

Figure 3:
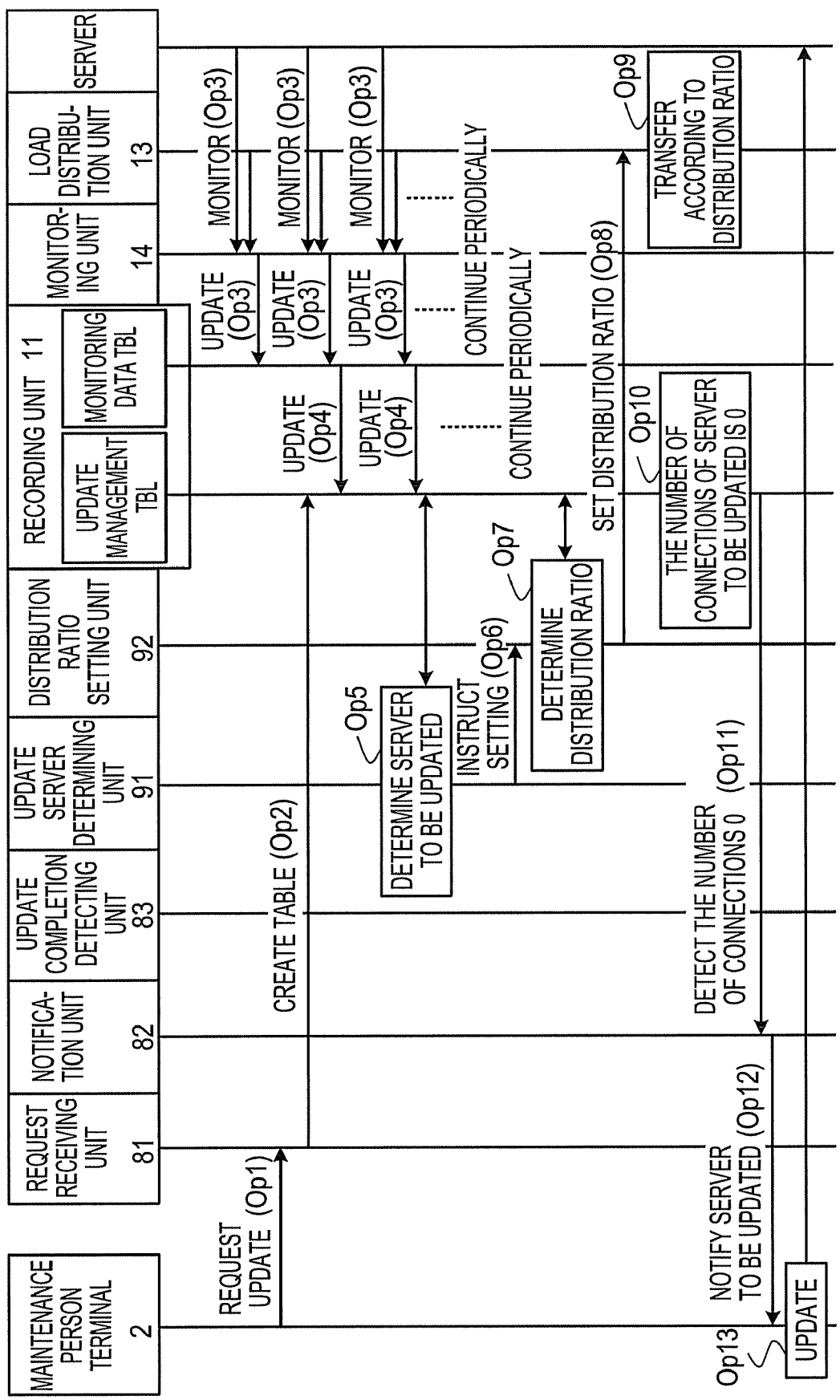
FIG. 3 illustrates a sequence diagram of an operation example of a load distribution device in an embodiment.

FIGS. 3 and 4 are sequence diagrams of an operation example of the load distribution device 1 in an embodiment. The processes shown in FIG. 3 continue to the processes illustrated in FIG. 4. The processes illustrated in FIGS. 3 and 4 are processes after the maintenance person has transmitted an update request (maintenance start request) to the load distribution device 1 through the maintenance person terminal 2 to update information, for example, security patches of the servers 4a to 4e.

In FIG. 3, after receiving the update request from the maintenance person terminals 2 (Op1), the request receiving unit 81 provides a notification of the update request to the maintenance control unit 9 (FIG. 2). The update request includes data indicating that the servers to be maintained are servers 4a to 4e. The maintenance control unit 9 generates, in the recording unit 11, the update management table 41 recording data related to the servers 4a to 4e to be maintained (Op2). At this point, the maintenance control unit 9 acquires traffic information and load information of each of the servers 4a to 4e from the monitoring data table 42 and records the information in the update management table 41. In the present operation example, the number of connections and the CPU load are acquired from the monitoring data table 42 and recorded in the update management table 41.

The monitoring unit 14 periodically monitors the servers 4a to 4e and the load distribution unit 13 to acquire the load information and the traffic information and updates the monitoring data table 42 (Op3). After generating the update management table 41, the maintenance control unit 9 periodically refers to the monitoring data table 42 and updates the information of the update management table 41 in accordance with the update of the monitoring data table 42 (Op4). As a result, the constantly changing load and traffic of each of the servers 4a to 4e are always reflected on the update management table 41.

When the update management table 41 is generated, the update server determining unit 91 refers to the update management table 41 and determines the server to be updated and the server to be updated next (Op5). For example, the update server determining unit 91 selects a server with the least number of connections with the user terminals (server 4b in the example shown in Table 2) as the server to be updated. As a result, the server expected to be blocked in the shortest time is selected as the server to be updated. The update server determining unit 91 changes the update state of the record of the server to be updated (server 4b) in the update management table 41 to "To Be Updated".

In Op5, the update server determining unit 91 compares the numbers of the connections of the "Not Updated" servers other than the server to be updated and determines the server with the least number of connections (server 4e in the example shown in Table 2) as the server to be updated next. The update state of the server 4e of the update management table 41 is changed to "To Be Updated Next".

After updating the update management table 41, the update server determining unit 91 instructs the distribution ratio setting unit 92 to set the allocation ratio (Op6). The distribution ratio setting unit 92 refers to the update management table 41 and calculates a new allocation ratio based on the update states and the allocation ratios of the servers (Op7). For example, the distribution ratio setting unit 92 divides the total of the allocation ratios of the server to be updated (server 4b) and the server to be updated next (server 4e) (5%+10%=15%) by three, which is the number of other (remaining) servers 4a, 4c, and 4d to be updated, and adds the value (5%) to the allocation ratios of the servers 4a, 4c, and 4d. As a result, the allocation ratios of the servers 4a, 4c, and 4d are 35%, 20%, and 45%, respectively. The allocation ratios of the servers 4b and 4e are set to 0% so that a new request from a terminal is not allocated to the servers 4b and 4e determined as the server to be updated next and the server to be updated.

A specific example of the process of the distribution ratio setting unit 92 in Op7 will be described at the end of the description of the present embodiment using a flow chart.

The distribution ratio setting unit 92 instructs the load distribution unit 13 to allocate new processing requests to the servers 4a to 4e at allocation ratios calculated in Op7 (at Op8). Specifically, the distribution ratio setting unit 92 notifies the allocation ratios calculated in Op7 to the load distribution unit 13. The load distribution unit 13 changes the allocation ratios of the servers according to the notification. As a result, the load distribution unit 13 transfers the frames, which are received by the receiving unit 12 for establishing new connections, to a server (server 4a, 4c, or 4d) other than the server to be updated (server 4b) and the server to be updated next (server 4e) (Op9). Thus, the server to be updated and server to be updated next are pre-blocked.

For example, the load distribution unit 13 continues to transfer accesses from user terminals, which are connecting sessions with the server 4b or 4e, to the servers 4b and 4e. However, connection requests of new sessions are transferred to a server other than the servers 4b and 4e.

In the processes after Op8, the numbers of connections of the servers 4b and 4e continue to decrease and never increase. The numbers of connections of the servers 4b and 4e eventually become 0. Usually, the number of connections of the server 4b as a server to be updated becomes 0 first. Thus, the server 4b is blocked. As a result, the updating operation of the server 4b can be performed, and the update preparation is completed. Table 3 below is an example of the data contents of the update management table 41 when the update preparation of the server 4b is completed.

TABLE 3

| Server | The Number of Connections | CPU Load | Allocation Ratio | Update State |
|---|---|---|---|---|
| Server 4a | 318 | 53% | 35% | Not Updated |
| Server 4b | 0 | 0% | 0% | To Be Updated |
| Server 4c | 160 | 32% | 20% | Not Updated |
| Server 4d | 423 | 32% | 45% | Not Updated |
| Server 4e | 50 | 10% | 0% | To Be Updated Next |

The maintenance control unit 9 periodically refers to the update management table 41 to monitor the number of users (the number of connections) accessing the server to be updated (for example, server 4b in this case). As a result, the maintenance control unit 9 waits for the server to be blocked so that the maintenance operation can be started. The maintenance control unit 9 can read out the information, such as the number of connections and CPU load, that changes in real time from the monitoring data table 42 and update the update management table 41.

When the number of connections of the server to be updated (for example, server 4b in this case) is 0, the maintenance control unit 9 notifies the completion of the update preparation to the notification unit 82 (Op11). The notification unit 82 notifies the maintenance person terminal 2 that the server 4b can be updated (Op12). For example, e-mail including a message that the server 4b can be updated is transmitted to the maintenance person terminal 2.

As a result, the maintenance person can recognize that the server 4b can be updated. The maintenance person then uses the maintenance person terminal 2 to update information including the security patch of the server to be updated (server 4b) (Op13).

FIG. 4 illustrates the following processes. When the updating process of the server 4b is completed, the maintenance person transmits e-mail to the load distribution device 1 through the maintenance person terminal 2, the e-mail indicating that the update of the security patch of the server 4b is completed (Op14). After receiving the e-mail, the update completion detecting unit 83 notifies the maintenance control unit 9 (FIG. 2) that the update of the server 4b is completed. After receiving the notification, the maintenance control unit 9 notifies the update server determining unit 91 of the fact that the update is completed and instructs the update server determining unit 91 to again determine the server to be updated and the server to be updated next (Op15).

After receiving the instruction, the update server determining unit 91 determines a new server to be updated and a new server to be updated next (Op5). At this point, the update server determining unit 91 sets the update state of the server to be updated (server 4b) finished with the update to "Updated" and determines a new server to be updated and a new server to be updated next. The determination process may be the same as Op5 of FIG. 3.

For example, the update server determining unit 91 determines a server among the servers that are not yet "Updated" (servers 4a and 4c to 4e) and that includes the least number of connections as the server to be updated. In this case, the server 4e as the server to be updated next is selected as the server to be updated, because the number of connections is decreased since a new processing request is not allocated. The update server determining unit 91 determines a server (for example, server 4c) among the non-updated servers 4a, 4c, and 4d other than the server to be updated, the server including the least number of connections, as a new server to be updated next. Therefore, in the update management table 41, the update state of the server 4b is changed to "Updated", the update state of the server 4e is changed to "To Be Updated", and the update state of the server 4c is changed to "To Be Updated Next".

When the update server determining unit 91 determines a new server to be updated, the server to be updated next may be automatically determined as the new server to be updated. A specific example of the process of the update server determining unit will be described later.

Subsequently, the processes the same as Op6 to Op12 of FIG. 3 are repeated. Thus, the distribution ratio setting unit 92 updates the allocation ratio so that the allocation ratios of new processing requests to the new server to be updated (server 4e) and the new server to be updated next (server 4c) determined by the update server determining unit 91 become 0%. As a result, the servers 4e and 4c are pre-blocked. The allocation ratio of the server 4e has been set to 0% in Op6 of the last time and is already pre-blocked. Therefore, the number of connections in the server 4e will be decreased in the course of time from the pre-blocking of the last time, and thus, the time required for blocking is shorter. In this way, the time from the pre-blocking to the blocking after the server to be updated next has become the server to be updated is reduced.

Table 4 below is a table of an example of data contents of the update management table 41 when the server 4e has become the server to be updated and is blocked.

TABLE 4

| Server | The Number of Connections | CPU Load | Allocation Ratio | Update State |
|---|---|---|---|---|
| Server 4a | 335 | 56% | 38% | Not Updated |
| Server 4b | 5 | 2% | 13% | Updated |
| Server 4c | 110 | 22% | 0% | To Be Updated Next |
| Server 4d | 445 | 33% | 48% | Not Updated |
| Server 4e | 0 | 0% | 0% | To Be Updated |

In the state shown in Table 4, the update preparation of the server 4e is completed, and the maintenance person can perform an updating operation of the server 4e.

The processes of Op5 to Op15 are repeated until all servers to be maintained (servers 4a to 4e) are updated. As a result, the maintenance person can update information, for example, the security patches of all servers 4a to 4e.

Tables 5 to 7 are examples of the data contents of the update management table 41 when the update preparation of the server 4c is completed following the above described operation example, when the update preparation of the server 4a is completed subsequently, and when the update preparation of the server 4d is completed subsequently.

TABLE 5

| Server | The Number of Connections | CPU Load | Allocation Ratio | Update State |
|---|---|---|---|---|
| Server 4a | 225 | 38% | 0% | To Be Updated Next |
| Server 4b | 10 | 4% | 20% | Updated |
| Server 4c | 0 | 0% | 0% | To Be Updated |
| Server 4d | 468 | 35% | 55% | Not Updated |
| Server 4e | 30 | 6% | 25% | Updated |

TABLE 6

| Server | The Number of Connections | CPU Load | Allocation Ratio | Update State |
|---|---|---|---|---|
| Server 4a | 0 | 0% | 0% | To Be Updated |
| Server 4b | 15 | 6% | 28% | Updated |
| Server 4c | 10 | 2% | 38% | Updated |
| Server 4d | 243 | 18% | 0% | To Be Updated Next |
| Server 4e | 92 | 18% | 33% | Updated |

TABLE 7

| Server | The Number of Connections | CPU Load | Allocation Ratio | Update State |
|---|---|---|---|---|
| Server 4a | 97 | 16% | 40% | Updated |
| Server 4b | 51 | 21% | 15% | Updated |
| Server 4c | 71 | 14% | 25% | Updated |
| Server 4d | 0 | 0% | 0% | To Be Updated |
| Server 4e | 141 | 28% | 20% | Updated |

In the state shown in Table 7, the servers 4a to 4e are all updated when the update of the server 4d to be updated is completed. In such a case, for example, a server that meets the conditions of the server to be updated is not detected in the process of the update server determining unit 91 in Op5. In that case, the update server determining unit 91 can determine that the updating operation is completed and transmit an update completion notification to the maintenance person terminal 2 through the request receiving unit 81. As a result, the repetition of the processes of Op5 to Op15 can be terminated.

Figure 5A:
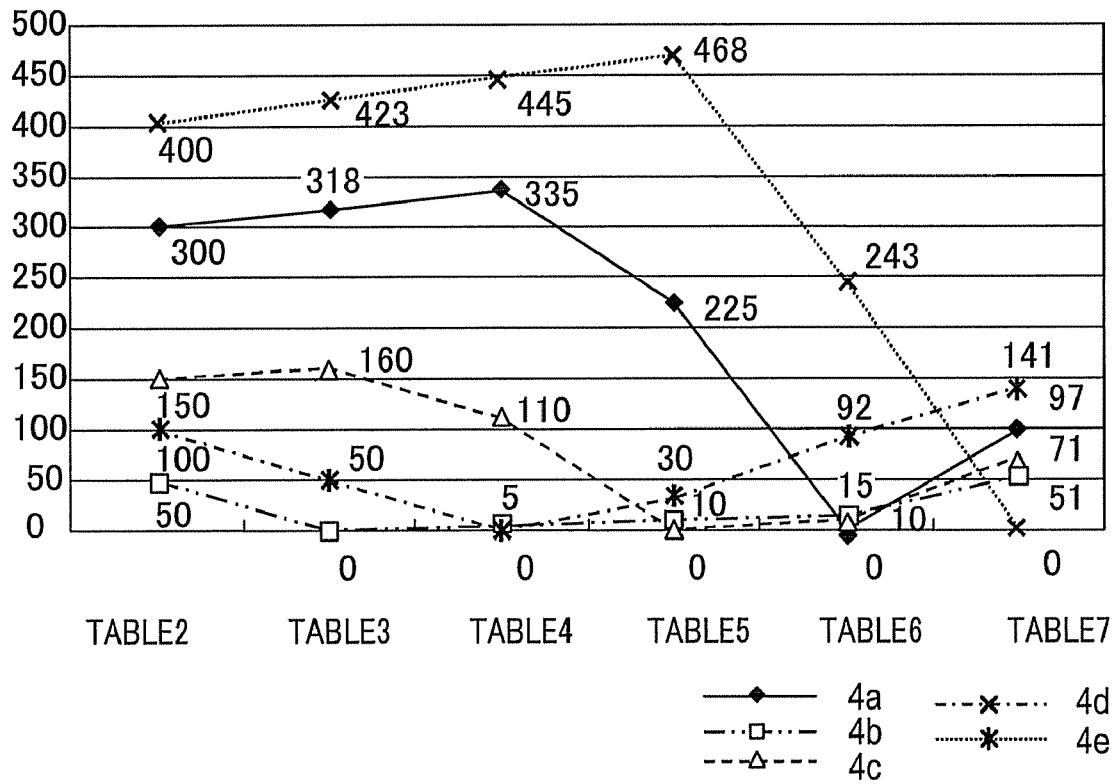
FIG. 5A illustrates a graph of a transition of a number of connections of each of servers in an operation.

FIG. 5A is a graph of a transition of a number of connections of each of the servers 4a to 4e shown in Tables 2 to 7 in the operation example. The vertical axis of the graph illustrated in FIG. 5A denotes the number of connections, and the number of connections of each of the servers 4a to 4e in each of Tables 2 to 7 is plotted in the graph. In FIG. 5A, the marks of rhombus, square, triangle, x, and * denote servers 4a, 4b, 4c, 4d, and 4e, respectively. In the transition of the numbers of connections illustrated in FIG. 5A, there is a tendency that the numbers of connections decrease at the stages before the servers 4a to 4e are blocked.

Figure 5B:
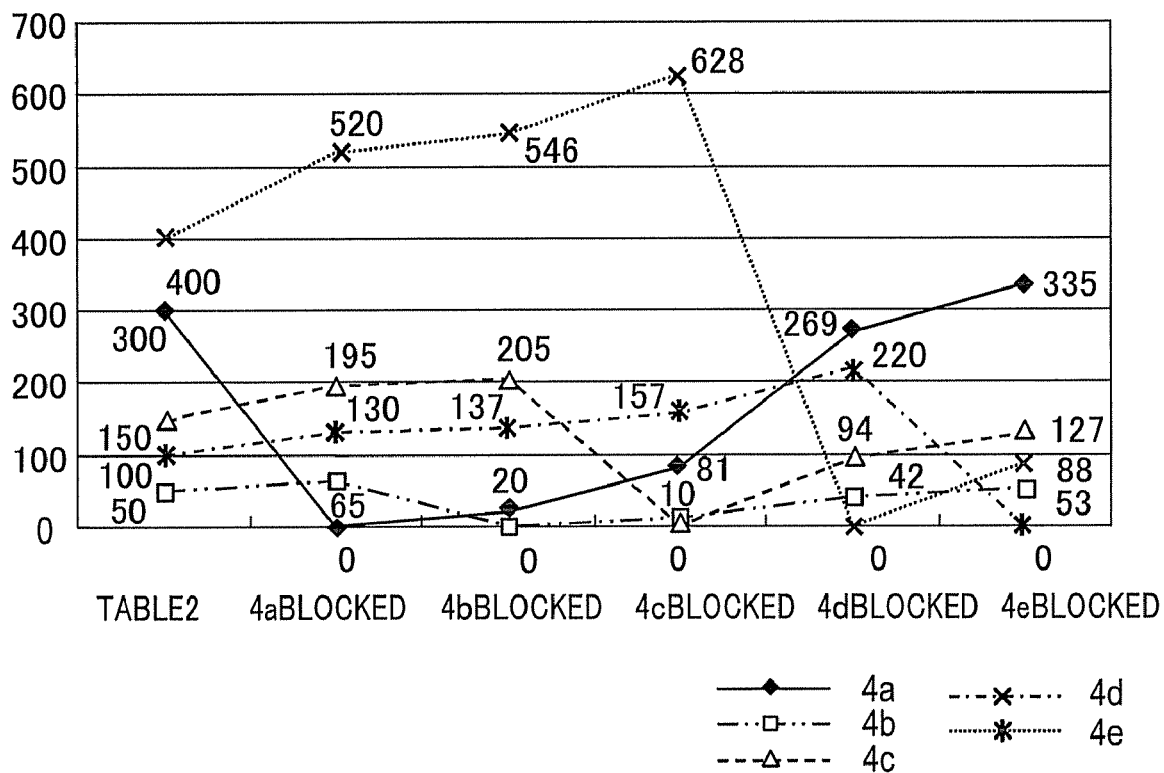
FIG. 5B illustrates a graph of a transition of a number of connections in a comparative example.

FIG. 5B is a comparative example depicting a graph showing a transition of the number of connections when the servers are pre-blocked in the order of servers 4a, 4b, 4c, 4d, and 4e from the state illustrated in Table 2, regardless of the number of connections. Compared to FIG. 5A, there is a tendency that the numbers of connections are large at stages before the blocking. If the numbers of connections at stages before the blocking are large, a long time is required to block the servers. This is because the number of connections and the time required for blocking tend to be proportional. Therefore, as illustrated in the graph of FIG. 5A, it can be understood that controlling the order of updates of the server 4a to 4e as in the operation example illustrated in FIGS. 3 and 4 can reduce the time to update, allowing an efficient updating operation.

FIG. 6 is a graph showing a bar graph, which illustrates the number of connections at stages before the blocking of the servers illustrated in FIG. 5A, and a bar graph, which illustrates the number of connections at stages before the blocking of the servers illustrated in FIG. 5B, side by side for each blocking stage of server. The numbers of connections in the embodiment of FIG. 5A are smaller than the numbers of connections in the comparative example of FIG. 5B in all stages. Therefore, it can be stated that the time required for blocking is shorter in the embodiment than in the comparative example.

As described, according to an embodiment, in the updates of the servers 4a to 4e in the load distribution configuration using the load distribution device 1, the load distribution device 1 appropriately changes the order of server updates and the allocation conditions of updates. As a result, the time required to update the servers can be reduced. Therefore, the servers can be updated without degrading the quality of service provided by the servers 4a to 4e as much as possible. This can limit the effect on the user associated with the server updates.

The operation load of the maintenance person, such as controlling the order of server updates and considering changing the allocation conditions or setting the allocation conditions during updates, can also be reduced. Furthermore, since the server update start timing is notified to the maintenance person, the maintenance person is relieved from the inconvenience of keeping an eye on the start timing of the server updates.

Figure 7:
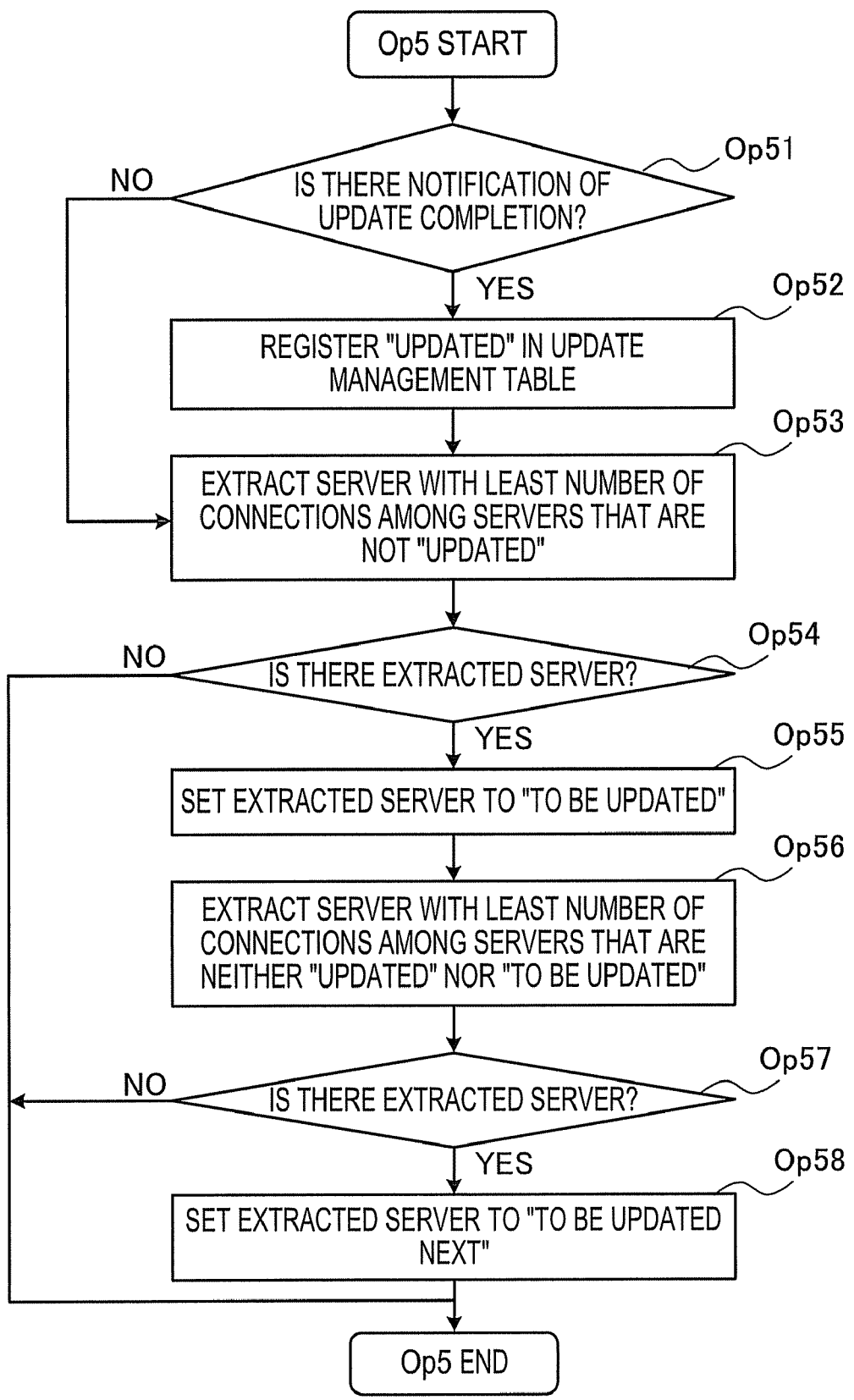
FIG. 7 illustrates a flow chart of an operation example of an update server determining unit.

FIG. 7 is a flow chart of an operation example of the update server determining unit 91. The example illustrated in FIG. 7 is an example of the process of the update server determining unit in Op5 of FIG. 3. The update server determining unit 91 first determines whether the update completion notification (Op15 of FIG. 4) of the server to be updated is received from the update completion detecting unit 83 (Op51).

When the update completion notification is received (YES in Op51), the update server determining unit 91 changes the update state of the record of the server to be updated, in which the update is completed, from "To Be Updated" to "Updated" in the update management table 41 (Op52).

The update server determining unit 91 then extracts, from the update management table 41, a server with the least number of connections among the servers in which the update state is not "Updated" (Op53). If such a server is extracted in Op53 (YES in Op54), the update server determining unit 91 changes the update state of the record of the extracted server to "To Be Updated" (Op55).

The update server determining unit 91 extracts a server, which includes the least number of connections among the servers whose update state is neither "Updated" nor "To Be Updated", from the update management table (Op 56). If such a server is extracted in Op 56 (YES in Op 57), the update server determining unit 91 changes the update state of the record of the extracted server to "To Be Updated Next" (Op 58).

As a result of the processes, the server to be updated and the server to be updated next are determined and recorded in the update management table. If a server satisfying the conditions of the server to be updated is not extracted (NO in Op57) or if a server satisfying the condition of the server to be updated next is not extracted (NO in Op57), the update server determining unit 91 terminates the process of Op5. When the server to be updated is not determined and the process of Op5 is terminated, the update server determining unit 91 can transmit an update completion notification to the maintenance person terminal 2 through the notification unit 82, the update completion notification indicating that there is no server that will be updated.

Figure 8:
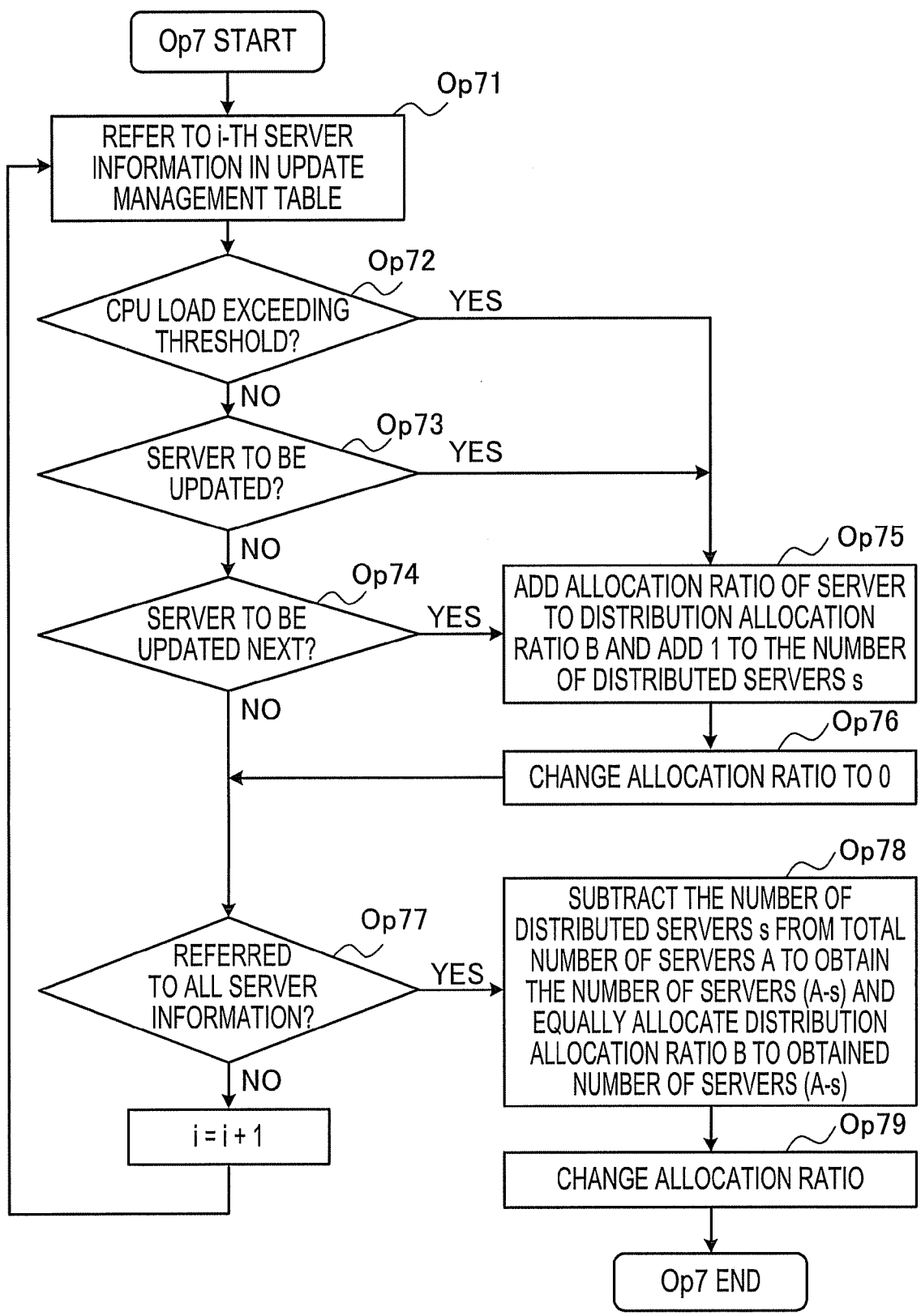
FIG. 8 illustrates a flow chart of an operation example of a distribution ratio setting unit.

FIG. 8 is a flow chart of an operation example of the distribution ratio setting unit 92 in Op7 of FIG. 3. In the example illustrated in FIG. 8, the distribution ratio setting unit 92 acquires server information indicated by i-th record recorded in the update management table 41 (Op71). In this case, i is a variable, which is initialized with i=1.

If the CPU load of the i-th record exceeds a threshold (Yes in Op72), if the update sate is "To Be Updated" (Yes in Op73), or if the update target is "To Be Updated Next" (Yes in Op74), the distribution ratio setting unit 92 executes the process of Op75.

In Op75, the distribution ratio setting unit 92 adds the record to a value B indicating a distribution allocation ratio. The value B indicating the distribution allocation ratio is initialized with B=0. The distribution ratio setting unit 92 further adds "1" to a value s indicating the number of distributed servers. The value s indicating the number of distributed servers is initialized with s=0.

The distribution ratio setting unit 92 further changes the allocation ratio of the record in the update management table 41 to "0%" (Op76).

The processes of Op71 to Op76 are repeated for all records in the update management table 41 (until determined Yes in Op77). When Yes is determined in Op77, the distribution ratio setting unit 92 subtracts the number of distributed servers s from the number of servers to be maintained (total number of servers A) recorded in the update management table 41 to obtain the number of servers (A-s). The distribution ratio setting unit 92 then calculates a value (B/(A-s)) in which the distribution allocation ratio B is divided by the obtained number of servers (A-s) (Op78).

The distribution ratio setting unit 92 adds the value (B/(A-s)) calculated in Op78 to the allocation ratio of record determined No in all Op72, Op73, and Op74 (Op79). As a result, the server to be updated, the server to be updated next, and the server whose CPU load exceeds the threshold are removed from the allocation target of the processing requests from the user terminals 5a to 5c, and allocation ratios are set so that the requests are allocated to other servers.

Figure 9:
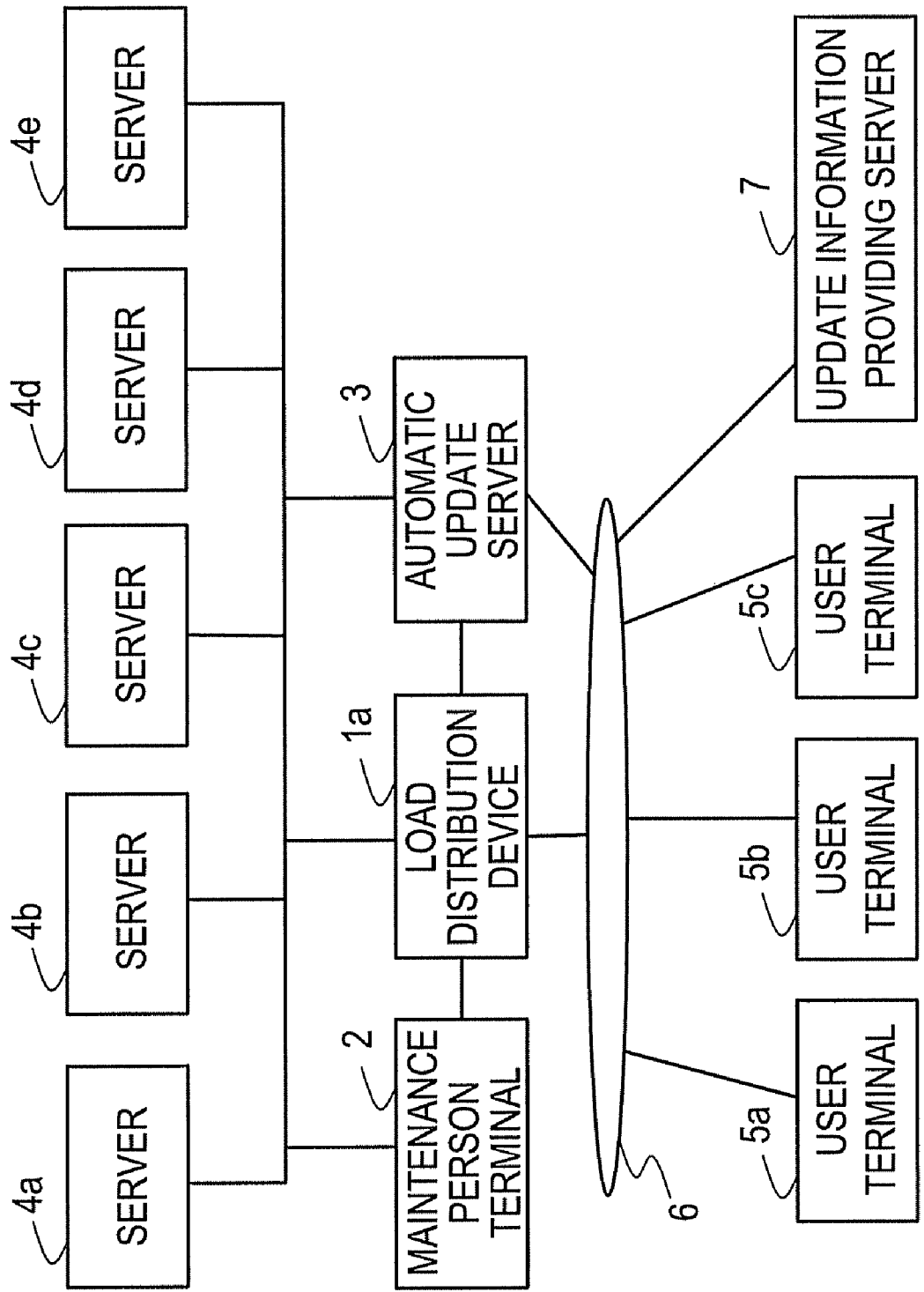
FIG. 9 depicts a configuration of an entire network including a load distribution device of an embodiment.

FIG. 9 depicts a configuration of an entire network including a load distribution device of a second embodiment. In an embodiment, a load distribution device 1a can be accessed from an automatic update server 3. Furthermore, an update information providing server 7 is connected to the network 6. In the configuration of the first embodiment, the maintenance person performs an update operation of the servers 4a to 4e through the maintenance person terminal 2. Whereas, an embodiment, the maintenance person transmits an update start instruction to the load distribution device 1a, and the load distribution device 1a automatically updates the servers 4a to 4e in collaboration with the automatic update server 3. Thus, the load distribution device 1a includes a collaboration function with the automatic update server 3.

The update information providing server 7 is, for example, a server installed on the network by a vendor providing software of the servers 4a to 4e. The automatic update server 3 provides data (update information) for updating the software of the servers 4a to 4e in a way that can be acquired through the network 6. An example of the update information includes an update program of the security patches. Although FIG. 9 depicts only one update information providing server 7, update information providing servers 7 for a plurality of vendors may be connected to the network 6.

The automatic update server 3 acquires update information of the servers 4a to 4e from the update information providing server 7 through the network 6 and automatically updates the software of the servers 4a to 4e using the update information. The automatic update server 3 also receives information indicating updatable servers and updatable timing from the load distribution device 1a and automatically updates the servers based on the information.

The automatic update server 3 can be constituted by, for example, an appliance server including an automatic update function. The appliance server is a server designed and developed for specific applications. Since only a device equipped with necessary functions can be selected as the appliance server, the installation cost can be reduced compared to a general-purpose server. In collaboration with a provider vendor, the appliance server including the automatic update function automatically detects a disclosure of patches, such as security patches, applications, firmware, and kernels, updated and distributed after detection of security holes or failures in the plurality of servers 4a to 4e that need to be maintained. The appliance server can automatically execute the update operations of the managed servers 4a to 4e. As a result, using the Web, FTP, or Telnet, the latest security patches can be always applied to the software of the servers 4a to 4e for providing services to the user terminals 5a to 5c.

Figure 10:
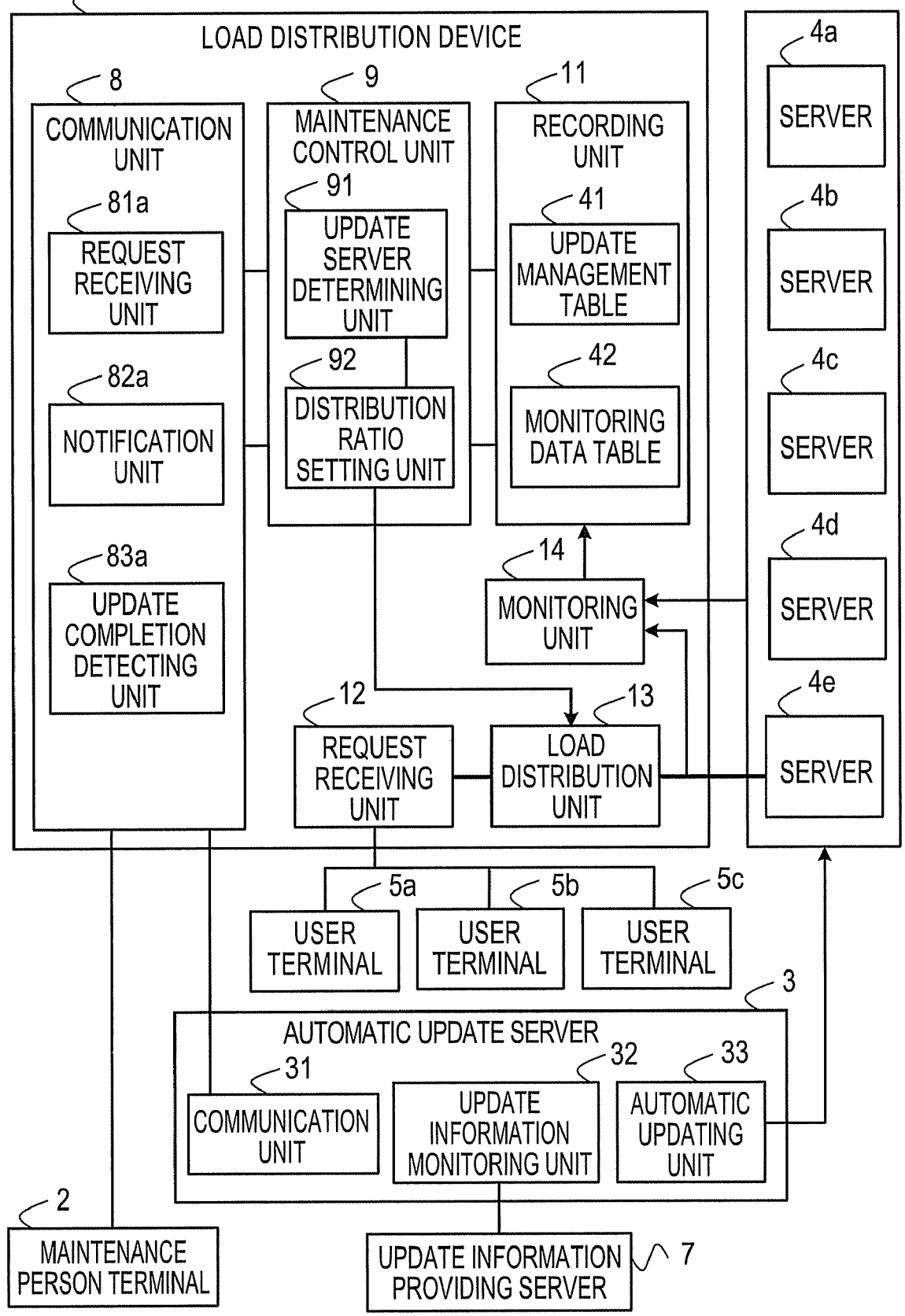
FIG. 10 illustrates a functional block diagram of a configuration of a load distribution device of an embodiment.

FIG. 10 is a functional block diagram of a configuration of the load distribution device 1a. In FIG. 10, the same functional blocks as in FIG. 1 are designated with the same reference numerals. A communication unit 8a of the load distribution device 1a illustrated in FIG. 10 includes a function of communicating with the automatic update server 3 in addition with the maintenance person terminal 2.

For example, when a request receiving unit 81a receives an automatic update start request that instructs the automatic update server 3 to start an automatic update of the servers 4a to 4e from the maintenance person terminal 2, the request receiving unit 81a can transmit an automatic update function termination instruction to the automatic update server 3 and instruct updating of the servers 4a to 4e at the update timing notified from the load distribution device 1a.

After the server to be updated is blocked from access and the update preparation is completed, a notification unit 82a notifies the automatic update server 3 of the fact that the server to be updated can be updated. As a result, the server that can be updated and the update timing are notified to the automatic update server 3. An update completion detecting unit 83a receives a notification from the automatic update server 3 of the fact that the update of the server to be updated is finished.

The automatic update server 3 comprises a communication unit 31, an update information monitoring unit 32, and an automatic updating unit 33. The communication unit 31 includes a function of communicating with the load distribution device 1a. For example, the communication unit 31 receives a notification of an updatable server and updatable timing from the load distribution device 1a and controls the timing of the update of the servers 4a to 4e by the automatic updating unit 33 based on the notification.

The update information monitoring unit 32 periodically monitors the network 6 to detect update information of the servers 4a to 4e disclosed by the update information providing server 7. The update information monitoring unit 32 acquires the detected update information from the update information providing server 7 and transfers the information to the automatic updating unit 33. The automatic updating unit 33 uses the transferred update information to update the servers 4a to 4e. In this case, the automatic updating unit 33 updates the servers 4a to 4e at the timing according to the notification from the communication unit 31. As a result, the load distribution device 1a controls the update timing of the servers 4a to 4e by the automatic updating unit 33.

The maintenance person can also control the update timing of the automatic updating unit 33 through the maintenance person terminal 2. For example, the maintenance person can transmit a signal, which instructs whether to update the automatic updating unit 33 when update information is detected or to update in accordance with a notification from the load distribution device 1a, to the distribution device 1a or the automatic update server 3 from the maintenance person terminal 2.

Figure 11:
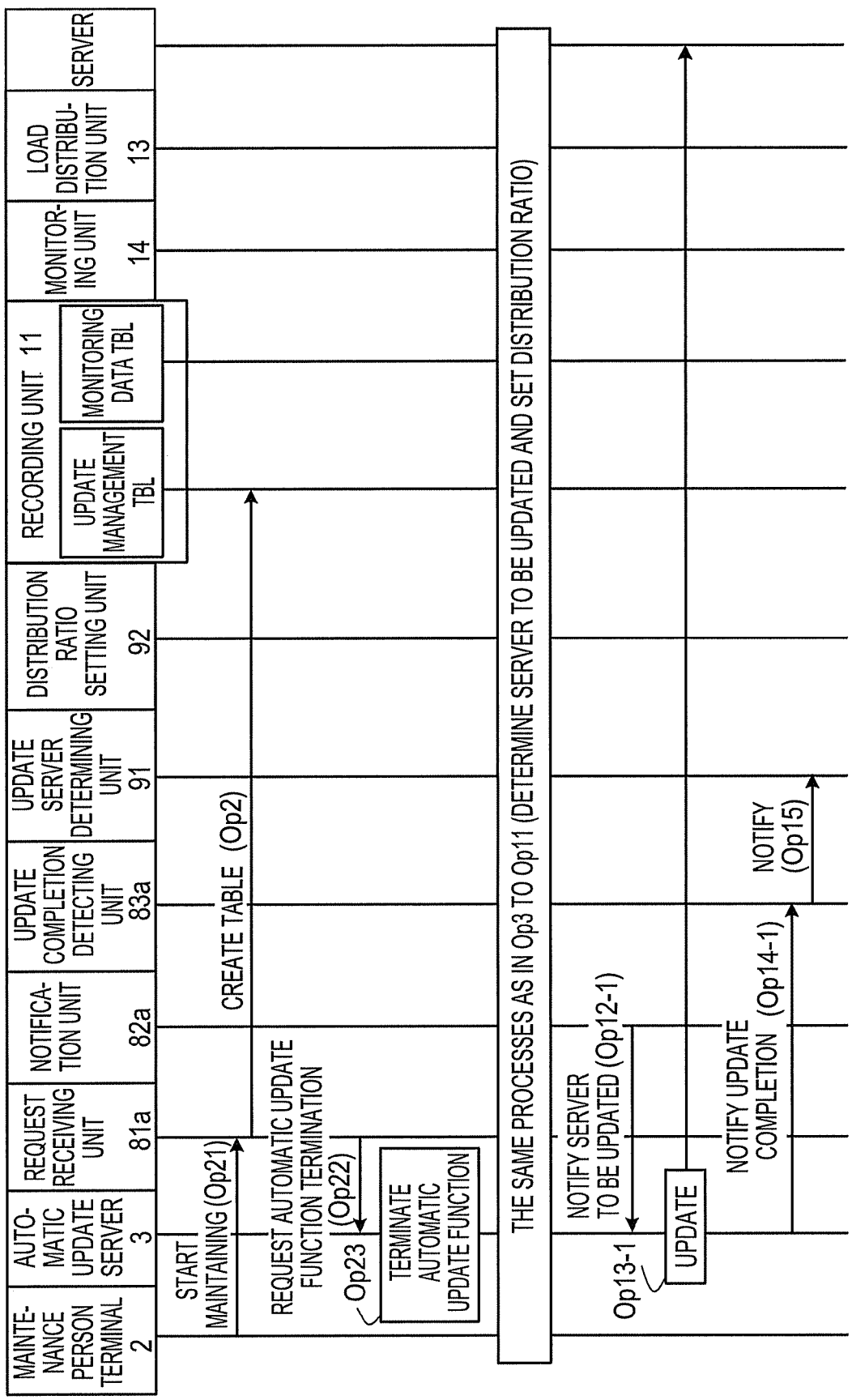
FIG. 11 illustrates a sequence diagram of an operation example of a load distribution device and an automatic update server.

FIG. 11 is a sequence diagram of an operation example of the load distribution device 1a and the automatic update server 3. As illustrated in FIG. 11, the request receiving unit 81a receives a maintenance start request from the maintenance person terminal 2 (Op21). After the request receiving unit 81a receives the maintenance start request, the maintenance control unit 9 (FIG. 2) creates a table (Op2). Op2 is the same as Op2 illustrated in FIG. 3.

The request receiving unit 81a transmits an automatic update function terminal request to the automatic update server 3 (Op22). In the automatic update server 3, the communication unit 31 receives the request, and the automatic updating unit 33 terminates the automatic update function (Op23).

Subsequently, as in Op3 to Op11 of FIG. 3, the update server determining unit 91 and the distribution ratio setting unit 92 execute the processes. When the number of connections of the server to be updated becomes 0 (blocked), the notification unit 82a notifies the update preparation completion of the server to be updated to the automatic update server 3 (Op12-1).

Receiving the notification, the automatic update server 3 executes an updating process of the server to be updated (Op13-1). For example, the update information monitoring unit 32 requests downloading of information such as a patch file of a security patch from the update information providing server 7 of the security patch providing vendor. After downloading the patch file, the update information monitoring unit 32 requests an update to the automatic updating unit 33. The automatic updating unit 33 starts updating the security patch for the server to be updated and restarts the server to be updated as necessary.

After completing the updating operation, the automatic updating unit 33 notifies the completion of the update to the update completion detecting unit 83a of the load distribution device 1a through the communication unit 31 (Op14-1). After Op15, the processes of Op5 to Op11, Op12-1, Op13-1, and Op14-1 are repeated for each of the servers 4a to 4b as of FIG. 3.

As a result of the operations, the maintenance person who wants to update the security patch can use the load distribution device 1a to cause the automatic update server 3 to execute the server updating operation from a server to be updated requiring less time for the maintenance operation. Therefore, efficient automatic updates of the servers 4a to 4e are possible.

Figure 12:
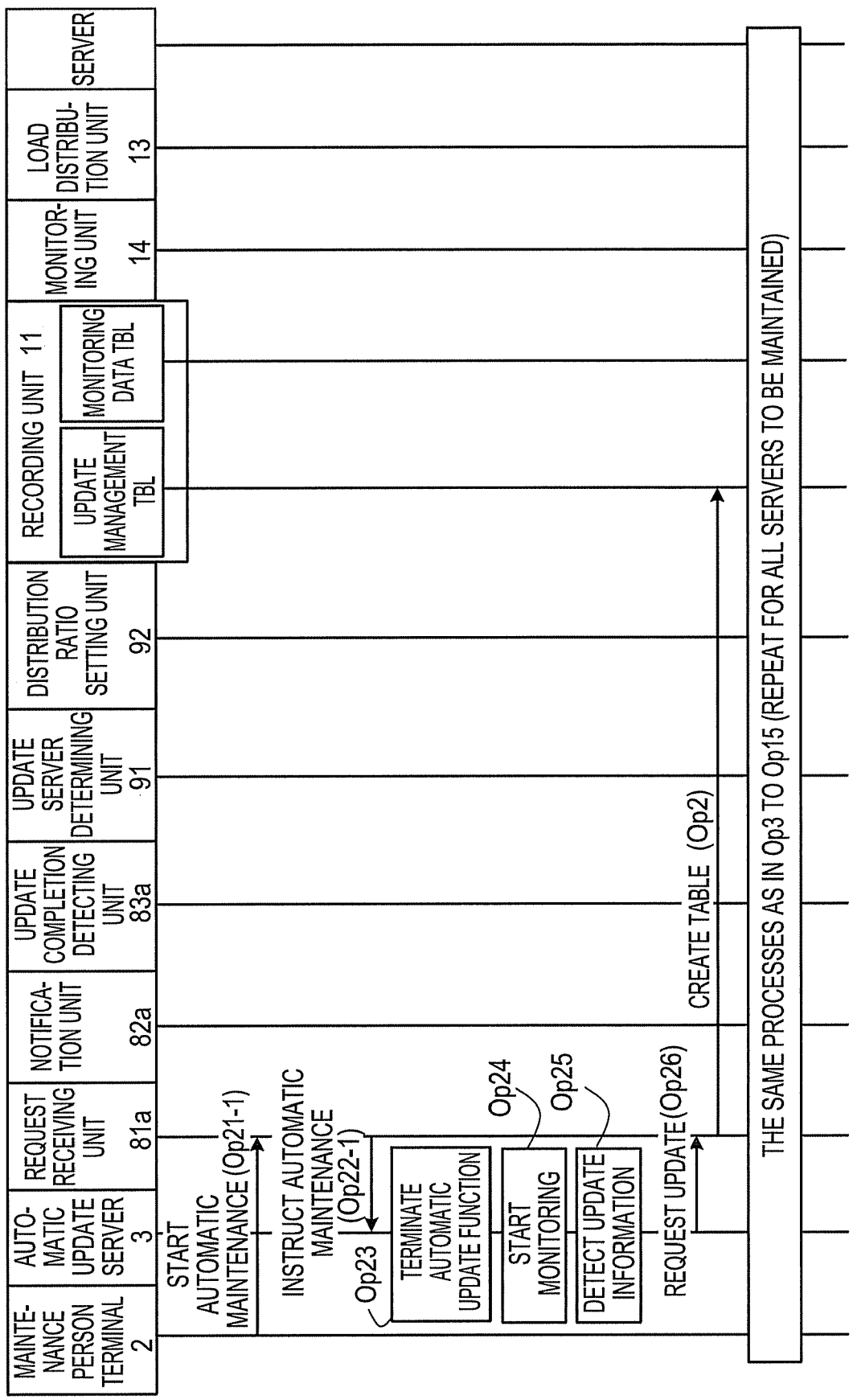
FIG. 12 illustrates a sequence diagram of another operation example of a load distribution device and an automatic update server.

FIG. 12 is a sequence diagram of another operation example of the load distribution device 1a and the automatic update server 3. In the example illustrated in FIG. 12, the request receiving unit 81a receives an automatic maintenance start request from the maintenance person terminal 2 (Op21-1). In this case, the request receiving unit 81a instructs an automatic maintenance to the automatic update server 3 (Op22-1).

The automatic update server 3 terminates the automatic update function (Op23). The update information monitoring unit 32 starts monitoring the security patch (Op24). The update information monitoring unit 32 uses a security patch update detecting function to detect a supply of a new security patch from the providing vendor (Op25). The update information monitoring unit 32 that has detected a supply of a new security patch transmits an update request of the new security patch to the request receiving unit 81a of the load distribution device 1a through the communication unit 31 (Op26). Subsequently, the processes of Op3 to Op15 are repeated for each of the servers 4a to 4e as in FIG. 11.

According to the operations, the maintenance person who wants to update the security patch can perform efficient automatic updates such as security updates of the servers 4a to 4e just by transmitting an automatic maintenance start request to the load distribution device 1a. Therefore, the latest security patches can be always applied.

According to the load distribution device disclosed in the present description, the time to update servers can be reduced without imposing a burden on the maintenance person. The same advantage can be obtained by a load distribution program and a load distribution method causing a computer to function as the load distribution device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention, the scope of which is defined in the claims and their equivalents.

What is claimed is:

1. A load distribution device that receives processing requests from terminals and that allocates and transfers the processing requests to at least one of a plurality of servers, the load distribution device comprising:
   a monitoring unit monitoring communication data between each of the plurality of servers and the terminals or an operation state of each of the plurality of servers, a result of said monitoring including data indicating an amount of processing executed by each server receiving the processing requests from the terminals being stored in a recording unit;
   a request receiving unit receiving a request of an update preparation of the plurality of servers from a maintenance person terminal or an automatic update server;
   an update server determining unit determining a first non-updated server among the plurality of servers that includes a least amount of processing indicated by the data of the recording unit as a server to be updated and determining a second non-updated server other than the first non-updated server to be updated that includes a least amount of processing as a server to be updated next;
   a distribution ratio setting unit setting a distribution ratio of new processing requests for each of the plurality of servers so that the new processing requests from the terminals are not allocated to any of servers determined to be updated but to other servers and recording distribution ratios to the recording unit;
   a load distribution unit allocating and transferring the new processing requests from the terminals to at least one of the plurality of servers based on the distribution ratios;
   a notification unit notifying the maintenance person terminal or the automatic update server that a server to be updated is updatable based on the result of said monitoring including data in the recording unit; and
   an update completion detecting unit receiving a notification from the maintenance person terminal or the automatic update server that an update is completed, and
   wherein when the update completion detecting unit receives the notification, the update server determining unit determines that the update is completed, determines a new server to be updated and a new server to be updated next, and instructs the distribution ratio setting unit to set the distribution ratios.

2. The load distribution device according to claim 1, wherein the monitoring unit records data indicating a load of each of the plurality of servers in the recording unit, and
   the distribution ratio setting unit calculates the distribution ratios of servers other than the server to be updated and the server to be updated next based on the load of each of the plurality of servers recorded in the recording unit.

3. The load distribution device according to any one of claims 1, wherein the request receiving unit receives an update request of update information from the automatic update server that has detected the update information of the plurality of servers through a network.

4. A load distribution system including a load distribution device receiving processing requests from terminals and allocating and transferring the processing requests to at least one of a plurality of servers and an automatic update server automatically updating the plurality of servers,
   the automatic update server comprising:
      an update information monitoring unit detecting update information of the plurality of servers through a network;

a communication unit transmitting an update request of the plurality of servers to the load distribution device when the update information is detected; and an automatic updating unit automatically updating the plurality of servers based on the update information, the load distribution device comprising:

a monitoring unit monitoring communication data between each of the plurality of servers and the terminals or an operation state of each of the plurality of servers, a result of said monitoring including data indicating an amount of processing executed by each server receiving the processing requests from the terminals being stored in a recording unit;

a request receiving unit receiving a request of an update preparation of the plurality of servers from the automatic update server;

an update server determining unit determining a first non-updated server among the plurality of servers that includes a least amount of processing indicated by the data of the recording unit as a server to be updated and determining a second non-updated server other than the first non-updated server to be updated that includes a least amount of processing as a server to be updated next;

a distribution ratio setting unit setting a distribution ratio of new processing requests for each of the plurality of servers so that the new processing requests from the terminals are not allocated to any of servers determined to be updated but to other servers and recording distribution ratios to the recording unit;

a load distribution unit allocating and transferring the new processing requests from the terminals to at least one of the plurality of servers based on the distribution ratios;

a notification unit notifying the automatic update server that a server to be updated is updatable based on the result of said monitoring including data in the recording unit; and an update completion detecting unit receiving a notification from the automatic update server of the fact that an updated is completed, and wherein when the update completion detecting unit receives the notification, the update server determining unit determines that the update is completed, determines a new server to be updated and a new server to be updated next, and instructs the distribution ratio setting unit to set the distribution ratios.

5. A non-transitory computer-readable storage medium storing a load distribution program for receiving processing requests from terminals and allocating and transferring the processing requests to at least one of a plurality of servers, the load distribution program causing a computer to execute operations comprising:

monitoring communication data between each of the plurality of servers and the terminals or an operation state of each of the plurality of servers, a result of said monitoring including data indicating an amount of processing executed by each server receiving the processing requests from the terminals being stored in a recording unit accessible by the computer;

receiving a request of an update preparation of the plurality of servers from a maintenance person terminal or an automatic update server;

determining a first non-updated server among the plurality of servers that includes a least amount of processing indicated by the data of the recording unit as a server to be updated and determining a second non-updated server other than the first non-updated server to be updated that includes a least amount of processing as a server to be updated next;

setting a distribution ratio of new processing requests for each of the plurality of servers so that the new processing requests from the terminals are not allocated to any of servers determined to be updated next but to other servers and recording distribution ratios to the recording unit;

allocating and transferring the new processing requests from the terminals to at least one of the plurality of servers based on distribution ratios;

monitoring the amount of processing to be updated indicated by the data in the recording unit, and when the server to be updated is determined to have become updatable, notifying the maintenance person terminal or the automatic update server that the server to be updated is updatable; and receiving a notification from the maintenance person terminal or the automatic update server that an update is completed, and wherein when the notification and when a non-updated server exists, the server to be updated completed with the update is determined to be updated, and the computer is caused to repeatedly execute the determining, the setting, the allocating and transferring, the monitoring and notifying, and the receiving the notification.

6. The non-transitory computer-readable storage medium according to claim 5, wherein the data indicating the load of each of the plurality of servers is recorded in the recording unit in the process of monitoring, and the distribution ratios of servers other than the server to be updated and the server to be updated next are calculated in the distribution ratio setting process based on the load of each of the plurality of servers recorded in the recording unit.

7. The non-transitory computer-readable storage medium according to any one of claims 5, wherein the receiving of the request of the update preparation of the plurality of servers includes receiving, an update request of update information from the automatic update server that has detected the update information of the plurality of servers through the network.

8. A method of processing requests, comprising:

monitoring communication data between plurality of servers and terminals, or an operation state of each of the plurality of servers including an amount of processing executed by each server;

receiving a request of an update preparation of the plurality of servers from a maintenance person terminal or an automatic update server;

selecting a first non-updated target of an update among the plurality of servers that includes a least amount of processing and determining a second non-updated target other than the first non-updated target to be updated; and setting the first non-updated target as having a lowest processing load subsequent to the update and selecting remaining non updated targets of the update based on adjustments made to load information after the update of the first target is complete, and wherein a distribution ratio of new processing requests for each of the plurality of servers is set so that the new processing requests from the terminals are not allocated to any of servers determined to be updated next but to other servers, and the new processing requests are allocated and transferred from the terminals to at least one of the plurality of servers based on distribution ratios;

monitoring the amount of processing to be updated indicated by the data, and when the server to be updated is determined to have become updatable, notifying a maintenance person terminal or an automatic update server that the server to be updated is updatable; and receiving a notification from the maintenance person terminal or the automatic update server that an update is completed, and wherein when the notification and when a non-updated server exists, the server to be updated completed with the update is determined to be updated, and the computer is caused to repeatedly execute the determining, the setting, the allocating and transferring, the monitoring and notifying, and the receiving the notification.

* * * * *